Oct. 17, 1933.    E. M. BROGDEN    1,931,463
APPARATUS FOR TREATING FRESH FRUIT IN PREPARATION FOR MARKET
Original Filed Dec. 15, 1924    4 Sheets-Sheet 1
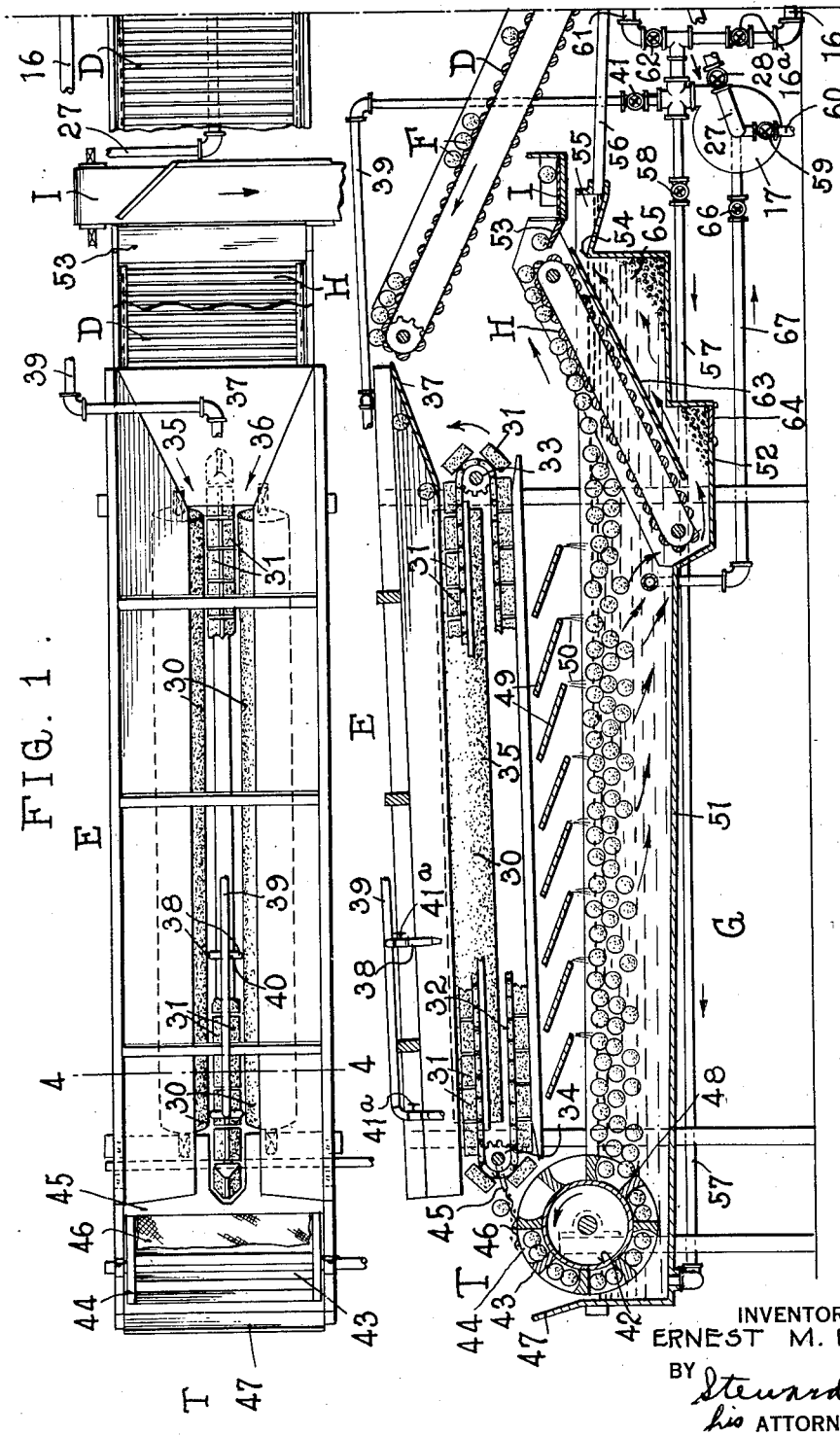

Oct. 17, 1933.  E. M. BROGDEN  1,931,463
APPARATUS FOR TREATING FRESH FRUIT IN PREPARATION FOR MARKET
Original Filed Dec. 15, 1924   4 Sheets-Sheet 2
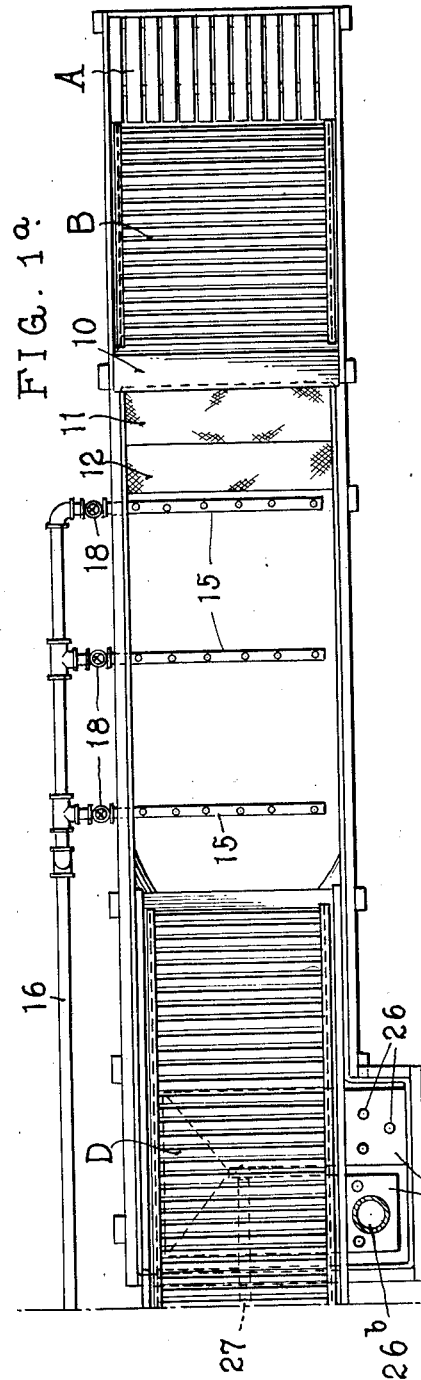
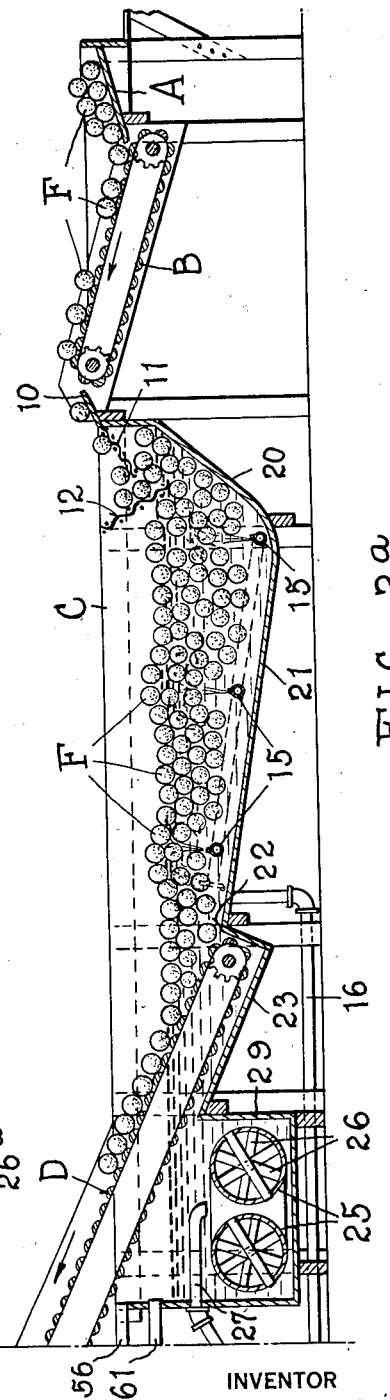
INVENTOR
ERNEST M. BROGDEN,
BY Steward + McKay
his ATTORNEYS

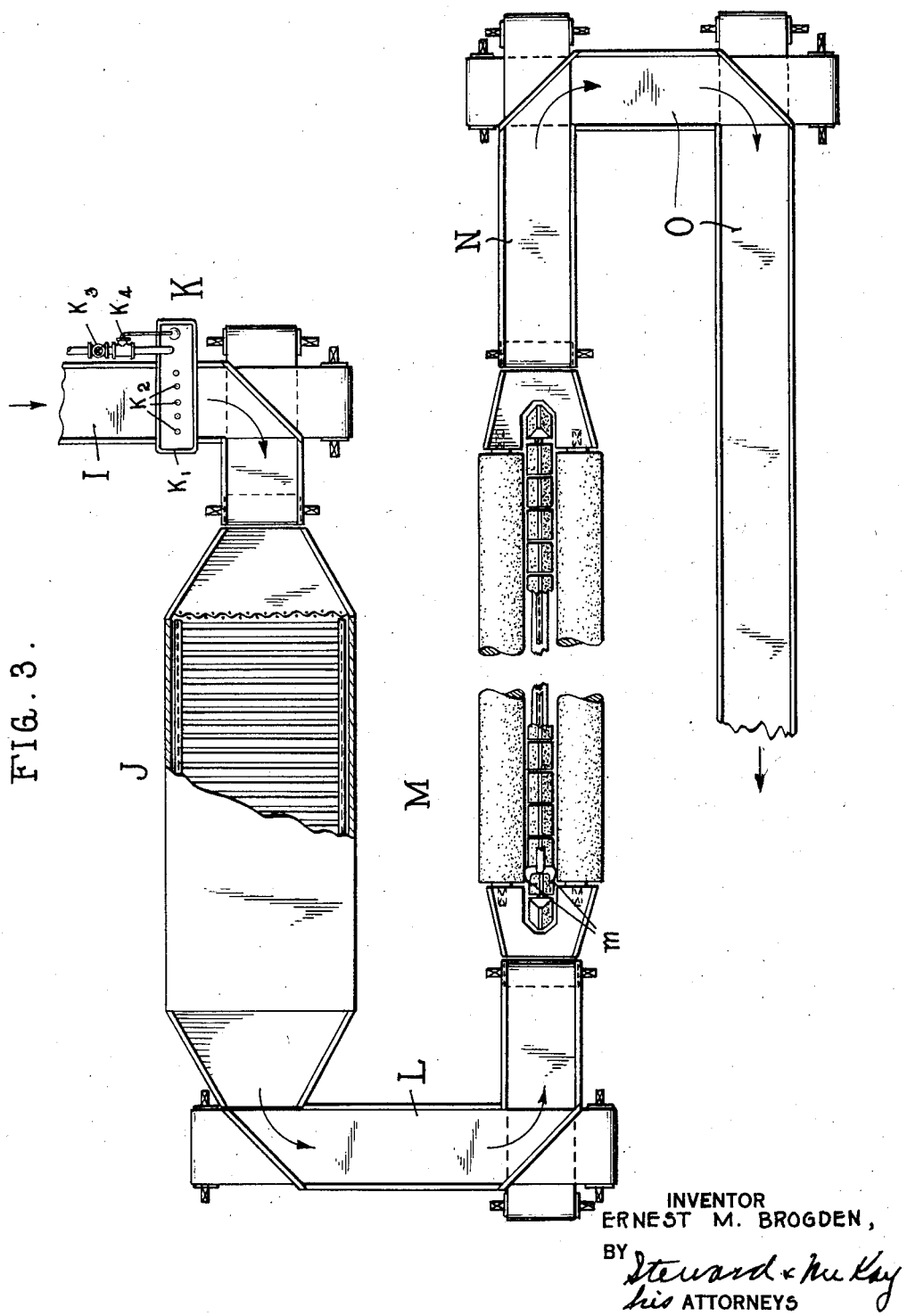

Patented Oct. 17, 1933

1,931,463

UNITED STATES PATENT OFFICE 1,931,463

APPARATUS FOR TREATING FRESH FRUIT IN PREPARATION FOR MARKET

Ernest M. Brogden, Pomona, Calif., assignor to Brogdex Company, Winter Haven, Fla., a corporation of Florida Original application December 15, 1924, Serial No. 756,120. Divided and this application October 29, 1932. Serial No. 640,311

1 Claim. (Cl. 146—194)

This invention relates to apparatus for treating fresh fruit in preparation for market; and in particular it relates to apparatus suitable for applying to fresh fruit, such as oranges or the like, a solution of a treating reagent, and then subjecting the treated fruit to a rinse with plain water to remove unnecessary excess of the treating reagent.

The present application is a division of a prior copending application Serial No. 756,120, filed December 15, 1924.

In the preparation of oranges and other fresh fruit for market, it has been found very desirable to subject the fruit, in the course of the packing house operations, to treatment with a solution of a suitable mold preventive or decay-inhibiting agent, borax being especially suitable for this purpose. It is desirable to subject the fruit to the action of a rather strong solution of the treating reagent for a substantial period of time, say from 5 to 15 minutes, for example, in order to properly impregnate all the rind tissues exposed by bruises, scratches, or other mechanical injuries, and thus to prevent development of blue mold and other forms of decay. However, after this thorough application of the treating solution to the fruit, it is desirable for various reasons to remove unnecessary excess of the treating reagent. For one thing, unless the unnecessary excess be removed, it appears as a visible deposit on the surface of the fruit after the fruit has been surface-dried, thus detracting from its appearance in market and lessening its salability. Accordingly, after thorough treatment of the fruit with the decay-inhibiting solution, the unnecessary excess of the solution is rinsed from the surface of the fruit with plain water.

The apparatus of the present invention enables the above described operation to be carried out in an effective and dependable manner. A desirable practical embodiment of the invention is illustrated more or less diagrammatically in the accompanying drawings wherein Figs. 1 and 1ª, considered together and placed end to end, constitute a plan view of that part of the apparatus system employed in applying a mold-inhibiting solution to the fruit, parts of the apparatus being shown broken away or to some extent removed in order to show underlying parts;

Figs. 2 and 2ª, similarly taken together, are in general a vertical longitudinal section of the apparatus shown in Figs. 1 and 1ª;

Fig. 3 is a plan view of apparatus for further handling the fruit after application of the mold-inhibiting solution thereto;

Figure 4:
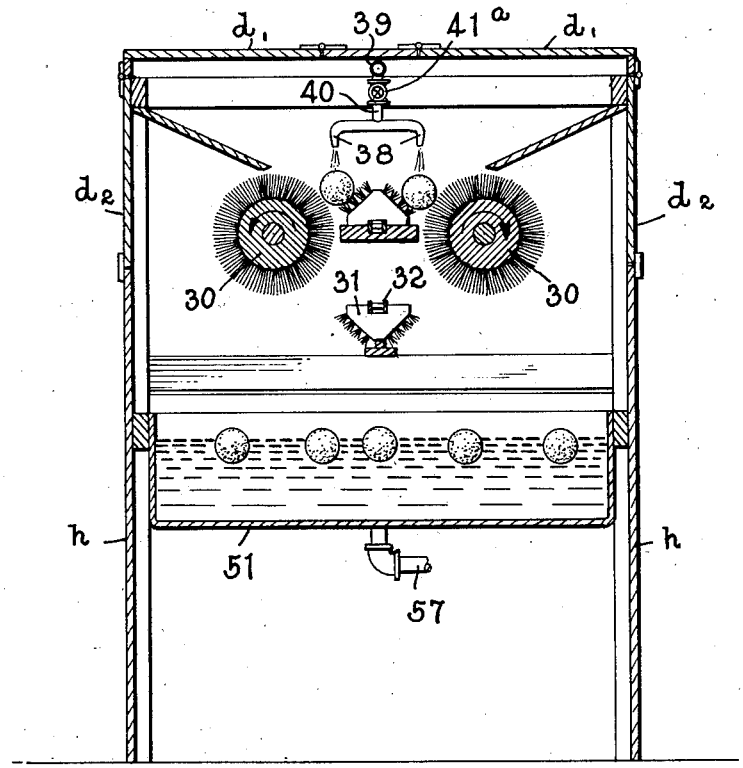
Fig. 4 is a cross-section on the line 4—4 of Fig. 1, illustrating constructional details of the washer device shown.
Figure 5:
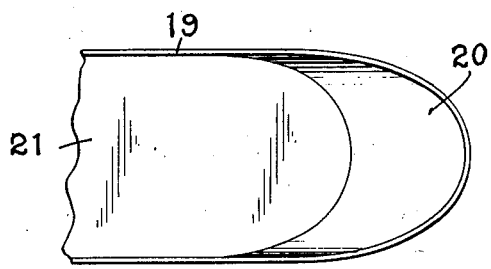
Fig. 5 is a fragmentary view, in plan, illustrating a desirable form for the receiving end of the soaking tank unit shown in Figs. 1ª and 2ª.

Referring to the drawings, A is a hopper into which fruit F, to be treated, is dumped. The elevator B conveys the fruit from said hopper and delivers it to a soaking tank indicated generally at C. Advancing toward the opposite end of this soaking tank, which contains a warm and suitably concentrated solution of a blue mold-inhibiting agent, borax for example, the fruit finally reaches the elevator D which conveys it up out of the tank and delivers it to the receiving end of a washer device E in which the fruit receives a thorough rubbing or scrubbing while further quantities of the warm treating solution are sprayed upon it. The fruit discharged from the lower or delivery end of the washer is lowered by means of a rotary transfer device T into a tank G extending underneath the full length of the washer. In this tank, which also contains warm borax solution, the fruit advances toward the right, as seen in Fig. 2, and is finally removed from the tank by the elevator H and discharged upon a conveyor belt I of ordinary type which conveys the fruit to a drier J, the fruit being rinsed while still on the conveyor belt and before entering the drier by means of plain water, that is, water containing no treating reagent, sprinkled or showered upon the fruit in controlled quantity by a sprinkling device K. In the drier J, the surface moisture is removed from the fruit, and if desired, the fruit may then be graded, sized and packed in boxes in the usual manner without further treatment. However, where it is desired not only to treat the fruit for prevention of blue mold decay, but also to provide it with a film-like protective coating of waxy material that will hold it plump and firm, thus preventing losses due to shrinkage and withering, the fruit upon leaving the drier is conveyed by the belt L to a rotary brush device of the polisher type, indicated at M, where a minute quantity of an appropriate composition comprising waxy material, is suitably applied to each fruit and thoroughly rubbed over the surface thereof by the action of the brushes. From the unit M, the fruit may pass by way of belt conveyors N and O to the graders and sizers for the final packing operations which may be of usual character.

The general course of the fruit through the apparatus system being understood from the foregoing brief statement, the apparatus will now be described in greater detail. Fruit is delivered by the elevator B to the tank C over the delivery or chute board 10, its fall being broken by baffle members 11 and 12 which may consist of strips of flexible material, such as canvas, stretched tightly across the entire width of the tank and suitably fastened at their ends in the staggered relation shown. Fruit delivered to the soaking tank falls successively upon members 11 and 12 and thence into the borax solution, being pushed below the surface of the latter by the weight of the fruit that follows. In the usual operation of the apparatus, the fruit piles up in tank C several layers deep as indicated in the drawing; and in order that the fruit in the several layers may be caused to exchange places so that all of the fruit may undergo submergence to a substantial depth in the treating solution during a considerable part of its travel through the tank, strong jets of treating solution may be forced into the tank near the bottom by means of one or more properly apertured headers 15 extending transversely of the tank near its bottom, the solution being supplied through pipe 16, valved at 16$^a$, by pump 17 in a manner hereinafter more fully described. Between each of the headers 15 and supply pipe 16 is located a gate valve 18 whereby any of the headers 15 may be cut off as conditions may require to give the best effect in advancing the fruit through the soaking tank. The jet header nearest the receiving end of the tank may advantageously be arranged to direct its jets obliquely toward the far end of the tank, thus facilitating initial movement of fruit toward that end. In order to facilitate substantially uniform movement of all the fruit through the tank, it is of advantage to construct the receiving end of the soaking tank C in the rounded form best shown in Figs. 2$^a$ and 5, the side and end walls 19 and 20, respectively, being curved forwardly and downwardly toward the tank bottom 21.

The bottom of the soaking tank C slopes gently upward to the point 22 where there is a downward jog providing a recess or packet 23 to accommodate the foot of the elevator D. Beyond the recess or pocket 23, and under the elevator D, is provided a compartment containing means whereby the treating solution can be heated to the desired operating temperature. In the present instance this means takes the form of a gas heater 24 of well known type comprising a U-shaped cylindrical shell 25, through which extend transverse water tubes or passages 26, the heater being fired by one or more suitable gas burners 26$^a$ discharging flame and hot gases into the intertubular spaces within shell 25, and the waste gases leaving through stack 26$^b$. The pump 17 has its intake connected to the heating chamber by pipe 27, valved at 28, and opening into the heating compartment at a point somewhat above the heater 24. This arrangement makes possible constant circulation of warm treating solution through pipe 27, pump 17, pipe 16 and headers 15 into the soaking tank and back over the upper edge of the compartment wall 29.

The fruit having received a thorough soaking in the tank C, the elevator D carries it up to the receiving end of the washer E. In the form here illustrated, this washer comprises two rotary brush rolls 30 arranged in parallel and sloping gently downward from the receiving end of the apparatus, cooperating with a series of brush elements 31 of triangular cross-section carried upon an endless chain 32 trained around sprockets 33—34, one of which is driven to carry the upper run of the endless chain of brushing elements thus formed between and longitudinally of the two rotary brush rolls 30, thus providing two fruit runways indicated generally at 35 and 36 into which the fruit discharged by the elevator D upon the chute board 37 enters and passes toward the discharge end of the washer.

A plurality of jets or taps 38, arranged at spaced intervals a short distance above each of the fruit runways, provide means for drenching the fruit with warm treating solution as it passes down said runways. These taps are supplied with solution from pump 17 through main supply pipe 39 and branches 40, the supply pipe 39 being valved at 41, as shown, and each of the branches being valved at 41$^a$, thus permitting ready adjustment of the amount of the solution sprayed upon the fruit. The thorough rubbing received by the fruit while wet with the warm treating solution, and especially after the preliminary soaking in the tank C, is very effective in securing intimate contact of the treating solution with all portions of the exterior of the fruit, thus enabling thorough impregnation of all surface porosities and exposed rind tissues with the mold-inhibiting agent and rendering the fruit mold-resistant. The washer may be enclosed in a housing $h$ having hinged top and side doors $d_1$, $d_2$, (Fig. 4) which may be opened for inspection or repair of the apparatus.

Upon leaving the washer E, the fruit is lowered into tank G by rotary transfer device T, as hereinabove stated, and is advanced gently through the tank G which contains warm borax solution. The general construction of transfer device T resembles that of a paddle wheel. It comprises a central drum 42, carrying blades 43 which extend radially therefrom, together with circular pieces 44 carried on the opposite faces of the drum and forming end walls for the receptacles or pockets, one of which is formed between each successive pair of adjacent blades 43. As the device rotates in the direction indicated by the arrow, the fruit discharged from the delivery end of the washer from chute board 45 drops into the pockets or compartments of the transfer device and is carried down into the body of treating solution contained in the tank G beneath the washer. A flexible member 46 of canvas or the like may be fastened to and extend beyond the chute board 45 in such manner as to cushion the drop of the fruit into the pockets of the rotary transfer device. In order that the fruit may be held in the pockets of the transfer device practically until it has been lowered to the level of the liquid in tank G, the carrying faces of the blades 43 may concave as shown. The upwardly extending guard member 47 at the end of the tank G prevents the possibility of an occasional fruit being discharged over the rear end of the tank. The operation of the wheel device T tends to advance the fruit through the tank G, each blade 43 gently pushing forward the fruit that rested on the preceding blade, as indicated for example at 48. The fruit is thus advanced slowly but systematically through the body of warm treating solution toward the opposite end of the tank. The layer of fruit at the surface of the liquid is constantly showered with the excess treating solution falling from the washer E above; and in order to render this showering more uniform and systematic, sloping distributing members 49 may be disposed below the washer and transversely thereof, as shown, to receive the drip from the washer and distribute it in the form of spaced transversely extending sheets of drip or spray, indicated at 50. Such distributing means are not essential but offer practical advantages.

The bottom 51 of the tank G may slope gently downward toward the foot of the elevator H, said foot being advantageously disposed in a transversely extending recess or well 52, as shown. By properly correlating the speed of the rotary transfer device T and the elevator H when the apparatus is first placed in operation, the fruit may be made to accumulate in the tank G to a depth of several layers, which is desirable, and therefore the elevator H can be operated at a speed just sufficient to remove the fruit from tank G as rapidly as it is delivered thereto by the transfer device T, thus maintaining the fruit several layers deep in the tank.

The fruit carried out of the tank G by the elevator H is discharged over chute board 53 to the conveyor belt I, as previously described. While on this belt, the fruit travels under fresh water sprinkler K (Fig. 3), already referred to, where it is showered with a carefully regulated amount of plain cool water sufficient in quantity to rinse from the surface of the fruit such excess of treating reagent, borax in this instance, as to prevent objectionable crystalline formation on the rotary conveyor elements of the drier J, and also to avoid objectionable visible deposit of such reagent on the fruit after it has been dried; without removing so much of the treating reagent as would again render the fruit subject to ready attack and destruction by blue mold or other rot organisms.

The sprinkler K may take the form of a small tank $k_1$ having a row of apertures $k_2$ in its bottom extending transversely of and a short distance above the belt I. Fresh water may be supplied to the tank through pipe $k_3$, and a constant head or level of water maintained in the tank by means of float-controlled valve $k_4$. The amount of water with which the fruit is rinsed as it passes under the sprinkler will depend upon the size of the apertures $k_2$, the head of water in the sprinkler tank, and the linear speed of the conveyor belt I. Any one or all of these factors can be adjusted to arrive at just the amount of rinsing required to achieve the objects above outlined. In a typical instance, where the speed of the conveyor belt I was about 100 feet per minute, it was found satisfactory to have the apertures $k_2$ about 5/64 inch in diameter and spaced about 3/8 inch apart in the row, while a head of 4½ inches of water was maintained in the tank $k_1$. In this connection it may be stated that it is advantageous as a rule to have previously maintained the fruit thoroughly wet with the treating solution for eight or ten minutes at least, thus allowing sufficient time for the warm solution to penetrate into the rind or into the minute surface crevices and exposed tissues thereof to such an extent that the subsequent rinsing with plain water does not materially lower the resistance of the fruit to blue mold or the like.

If the fruit is also to be provided with a waxy protective coating, it is conveyed to unit M, already referred to, after being rinsed and then surface-dried in drier J. The unit M may be generally similar in construction to washer unit E, the rotary brush rolls of the unit M usually having soft surfaces of horsehair bristles. The small quantity of waxy material necessary to apply to the fruit to obtain the desired protective waxy coating may be sprayed or atomized upon the fruit as it travels down the runways of the unit M by means of air brushes or similar spray devices M, one of which is mounted above each runway near the receiving end of unit M, as shown.

In the usual operation of the system shown in the drawings, the working level of the liquid in the tank G always remains constant irrespective of the quantity of the fruit passing through the tank. This constant level is fixed by the overflow weir 54, the excess solution discharging over this weir into a launder 55 and returning by way of a drain 56 to the soaking tank C, as shown, the upper edge of the soaking tank being disposed slightly below the liquid level in tank G in the particular installation here illustrated. The liquid level in the soaking tank C, on the other hand, may fluctuate considerably, but should always be somewhat above the upper edge of partition 29 in order that there may be free flow of liquid between the heating compartment and the soaking tank proper.

To provide for additional and more rapid circulation of the treating solution through the tank G, the discharge side of pump 17 may be connected by line 57, valved at 58, to the remote end of the tank G as shown. The pump intake may also be connected by pipe 59, valved at 60, to a fresh water supply line so that make-up water may be introduced through supply pipe 61 valved at 62 into the heating compartment of tank C, together with such fresh additions of borax as may be required to maintain the proper quantity and proper concentration of the treating solution.

Baffle plate 63 may be arranged on the elevator H in tank G, extending from a point above the liquid level in said tank to a point near the foot of said elevator before described above the bottom of the recess or well 52. This baffle plate extends across the entire width of the tank and may fit closely against the opposite sides of said tank. In order to escape over the weir 54, therefore, the treating solution is obliged to travel down around the foot of the elevator and under the baffle plate, following the general course indicated by the arrows. At the locations 64 and 65, the channel for the flow of solution is of ample width and the velocity of the solution is accordingly relatively slow, affording opportunity in these localities for suspended matter to settle out, as indicated. When it is desired to clean out tank G, the bulk of the solution therein can be removed by the pump through suction line 67, valved at 66, and discharged into the heating compartment of the tank C.

In the use of the described apparatus, it is desirable for best results that the fruit, just as it comes from the grove and without any preliminary cleansing, be subjected to the action of the mold-inhibiting solution aforesaid. Preliminary washing of the fruit has the undesirable effect of filling the surface crevices and saturating wounded tissues of the fruit rind with water, so that when the treated solution is applied to the fruit, not only do the wounded rind tissues fail to drink up the solution as readily as they do in the case of fruit previously unwashed, but also there is some liability to cause dilution of the mold-inhibiting agent in such degree as materially to reduce or even destroy its effective action unless precautions are taken to prevent this.

What is claimed is:

In an apparatus for preparing fresh fruit for market, the combination of a tank for containing a solution of a mold-inhibiting agent without disintegrating action on the skin or rind of the fruit, means for causing a continuous movement of said fruit through said solution, an elevating conveyor against which said fruit is directed by said means and which is so arranged that solution draining from said fruit thereon is returned to said tank, a rinse conveyor having its receiving end disposed below the discharge end of said elevating conveyor and having a fruit-conveying path of travel in a direction away from said tank, gravity means for transferring fruit from said elevating conveyor to said rinse conveyor, and means for applying relatively clear water to said fruit on said rinse conveyor at a locality so separated from said tank that used rinse water does not drain thereinto and in a manner to rinse solution from the skin or rind of said fruit without disintegrating action on said skin or rind.

ERNEST M. BROGDEN.